June 20, 1961 A. E. SHLAGER 2,988,934
SPACING DRILL
Filed March 26, 1958 5 Sheets-Sheet 3
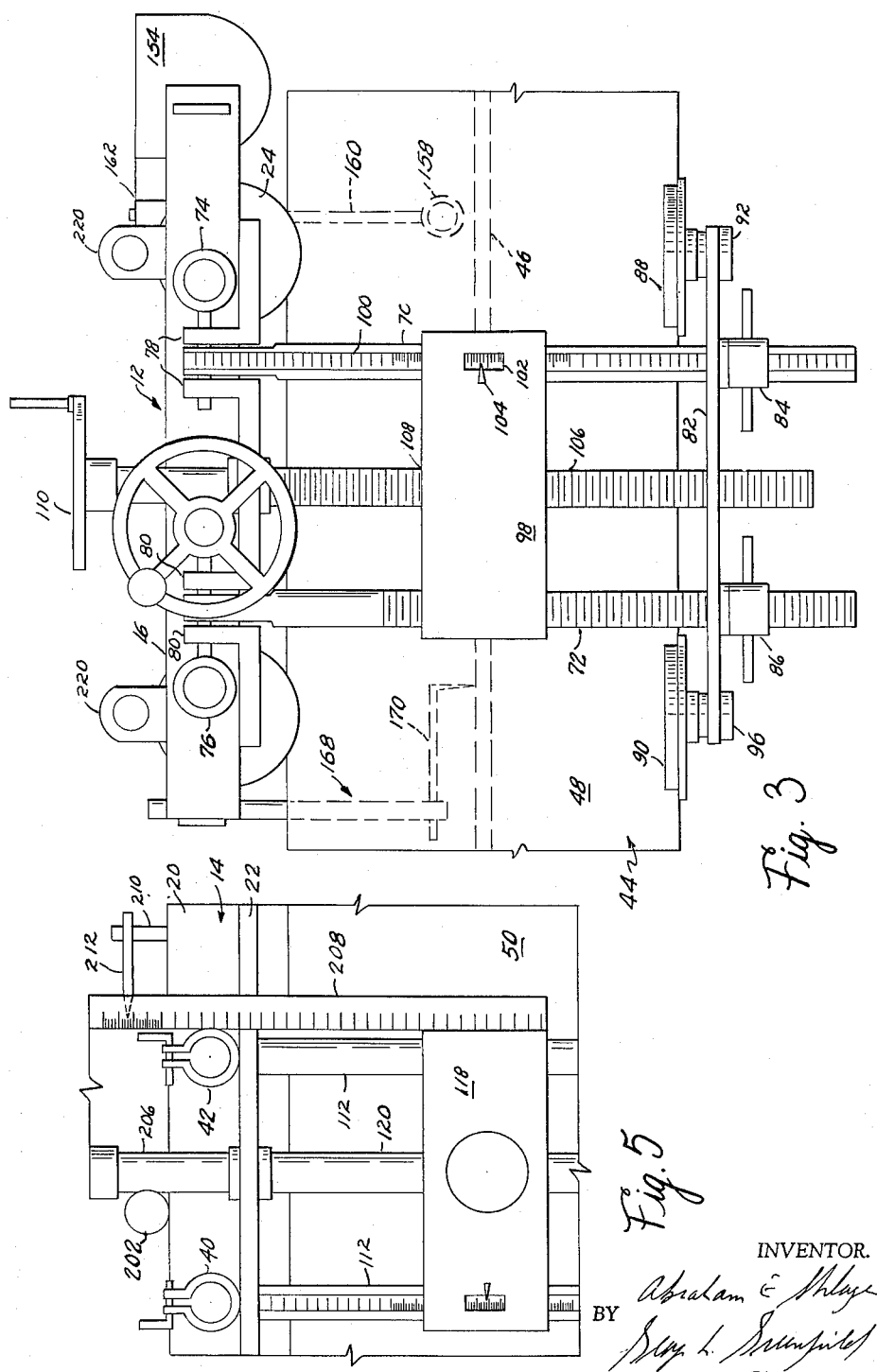

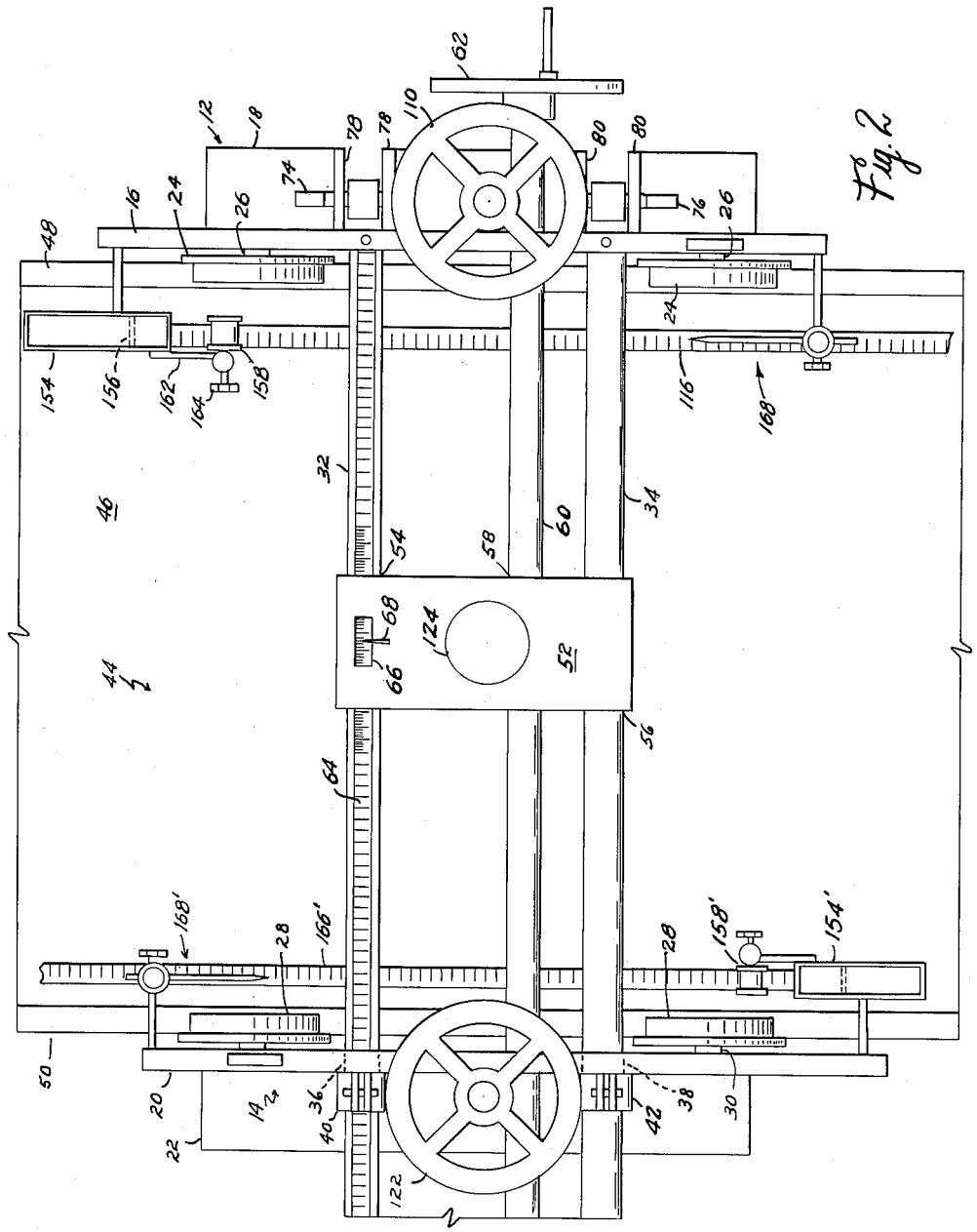

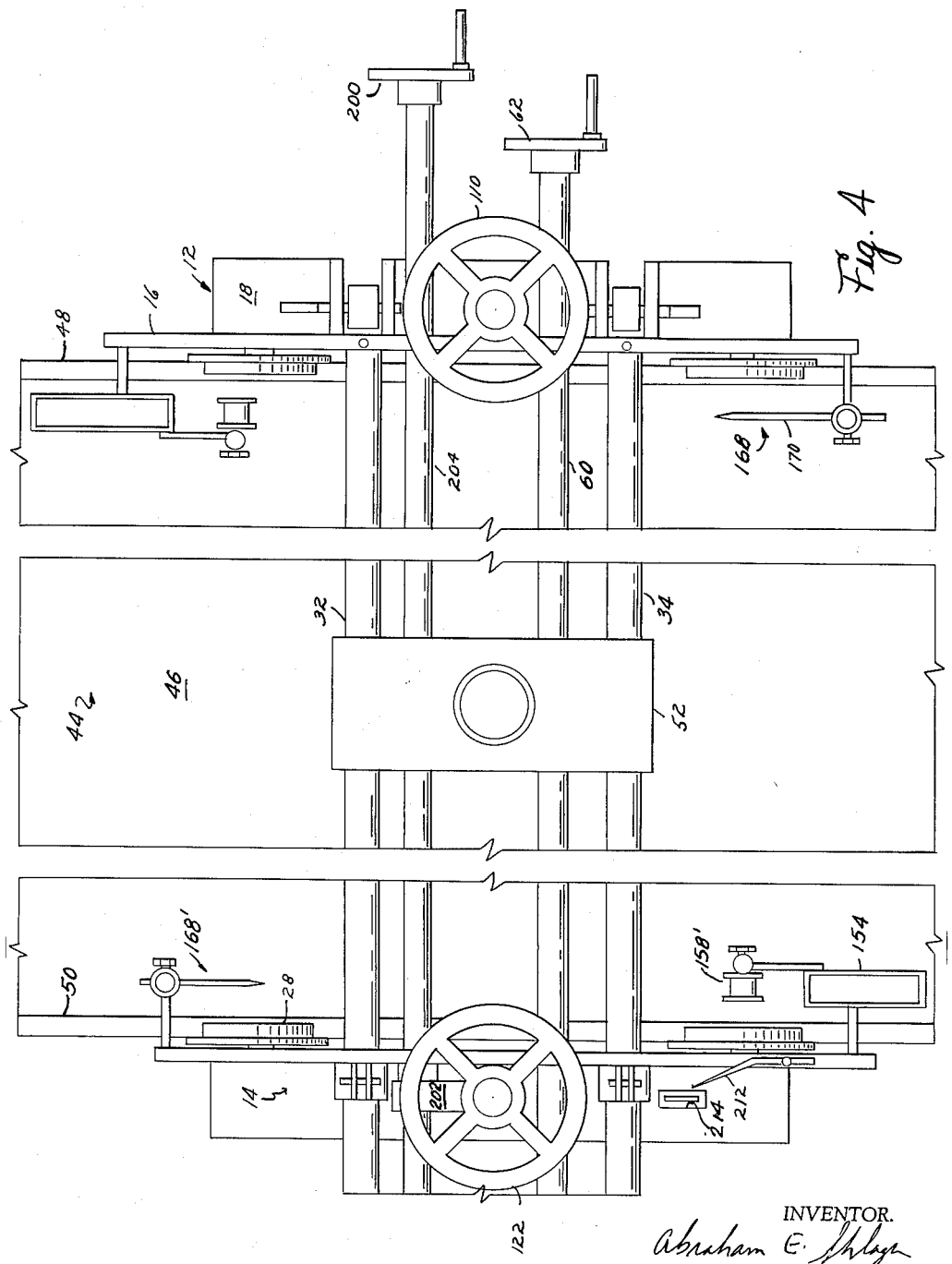

2,988,934
SPACING DRILL
Abraham E. Shlager, 15 Thatcher St., Brookline, Mass.
Filed Mar. 26, 1958, Ser. No. 724,096
8 Claims. (Cl. 77—21)

This invention relates to steel fabrication and more particularly comprises a new and improved spacing drill for fabricating I-beam stock.

At the present time, the minimum conventional equipment found in beam fabricating shops costs in excess of $100,000. In sizable shops, this equipment is duplicated many times to enable the fabrication of larger quantities of stock.

The fabricating operation normally requires a layout man to locate and center punch the points on the beam where holes are to be formed. After the center punching has been completed, the beam must be moved to the punch or drill used to form the holes in the web and flanges. The beam is handled many times during these operations and is moved both translationally and rotationally before the fabrication is completed. Even the modern spacing tables which punch the holes without the need of a separate layout operation require both rotational and translational movement of the beam to complete its operation. These spacing tables are extremely expensive and require a number of operators.

The primary object of my invention is to provide a fabricating machine which substantially eliminates handling of the beams.

Another important object of my invention is to provide a machine which performs the entire fabricating operation under the control of one man.

Another important object of my invention is to provide a machine which forms the holes in the flanges and the web without prior layout work or center punching.

To accomplish these and other objects, my invention includes a frame supported by a number of flanged wheels which are adapted to run along the flanges of the I-beam to be fabricated. The frame carries three drills which are arranged about the beam so that a drill faces each of the flanges and the third drill faces the web. The bits of the drills are aligned transversely across the beam normal to its length so that they are disposed the same distance from the ends of the beam. Each of the drills is supported on a slidable table which forms part of the frame and enables an operator to move each drill transversely across the web and flanges. Measuring scales are provided on the supports of the tables to indicate the precise position of the drills from the edges of the flanges and the web. Still another measure is provided which indicates the distance of the drills from the ends of the beams.

These and other objects and features of my invention along with its incident advantages will be better understood and appreciated from the following detailed description of a number of embodiments thereof selected for purposes of illustration and shown in the accompanying drawings in which:

FIGURE 2 is a plan view of the spacing drill shown in FIGURE 1;

FIGURE 3 is a right side elevation view of the invention shown in FIGURES 1 and 2;

FIGURE 4 is a plan view of a second embodiment of my invention;

FIGURE 5 is a left side elevation view of the embodiment shown in FIGURE 4; and

Figure 1:
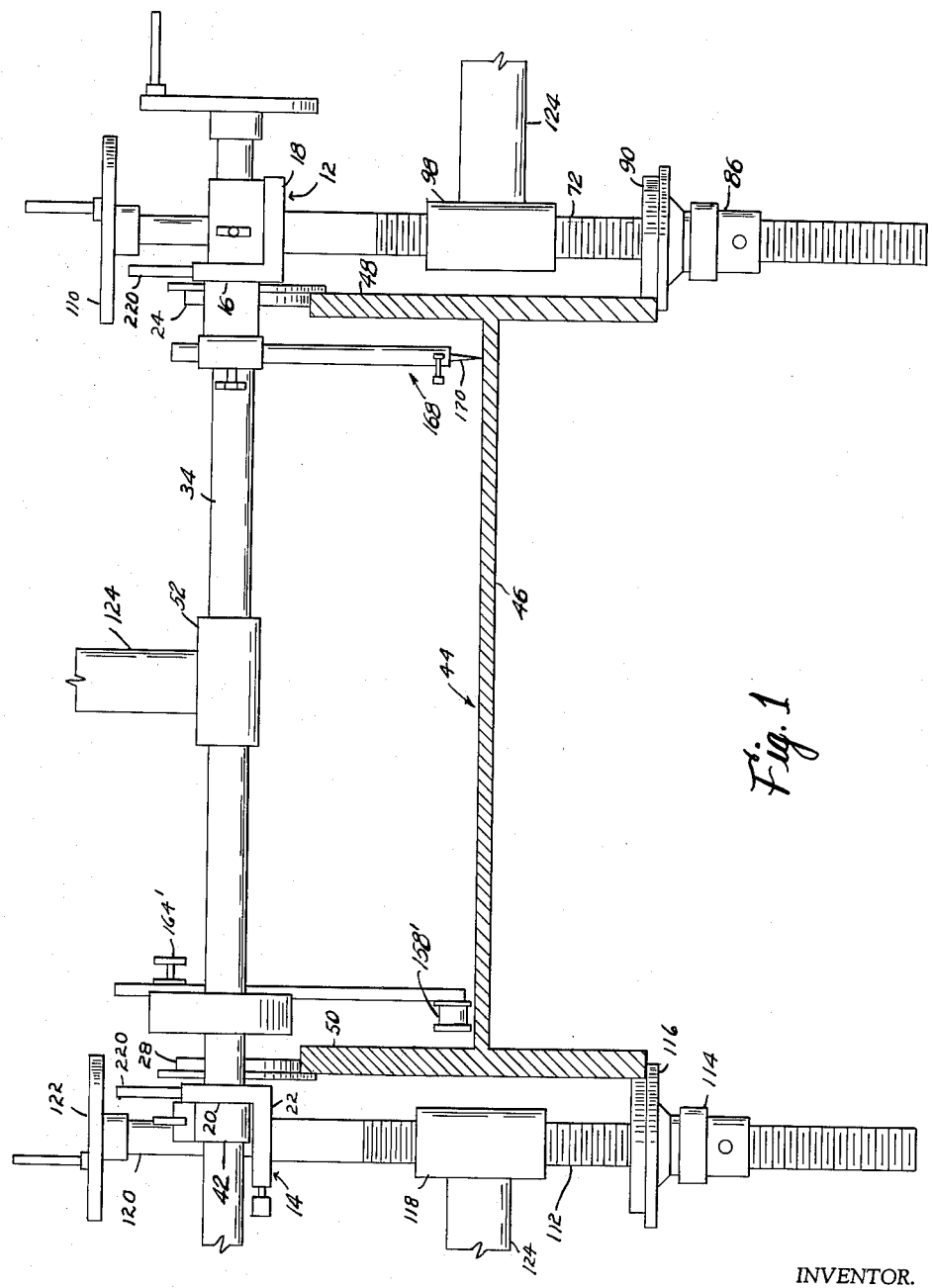
FIGURE 1 is a front elevation view of one embodiment of a spacing drill constructed in accordance with my invention.

The embodiment of my invention shown in FIGURES 1–3 includes a frame 10 generally assembled about a pair of parallel side supports 12 and 14. The support 12 includes a vertical flange 16 and a horizontal flange 18, and the support 14 includes similar vertical and horizontal flanges 20 and 22, respectively. The side support 12 carries a pair of flanged wheels 24 borne by stub shafts 26 secured to the vertical flange 16. Similar wheels 28 are carried by the stub shafts 30 on the vertical flange 20 of the support 14.

The side supports 12 and 14 are secured together by a pair of parallel and tubular cross bars 32 and 34 anchored at one end to the vertical flange 16 of the support 12 and which extend through openings 36 and 38 formed on the vertical flange 20 of the support 14. A pair of split clamping collars 40 and 42 are secured to the cross bars 32 and 34, respectively, outside of the vertical flange 20 and prevent the side support 14 from being drawn off the bars. It is evident particularly in FIGURES 1 and 2 that the cross bars 32 and 34 extend a considerable distance beyond the flange 20, and, therefore, the distance between the two side supports 12 and 14 may be readily varied by loosening the collars 40 and 42 and moving the support 14 either toward or away from the support 12.

The apparatus thus far described is adapted to ride on the adjacent edges of the flanges of the I-beam to be fabricated, as suggested in the elevation view of FIGURE 1. The I-beam 44 shown in cross section in that figure includes a web 46 and a pair of flanges 48 and 50. The wheels 24 carried on the support 12 ride along the upper edge of the flange 48 while the wheels 28 ride upon the upper edge of the flange 50. The flanges formed on the wheels abut against the outer faces of the flanges 48 and 50 and prevent the frame 10 from running off the sides of the beam. Thus, the upper edges of the flanges serve as tracks along which the frame 10 may travel during the fabricating operation.

The cross bars 32 and 34 which interconnect the supports 12 and 14 carry a table 52 which is free to move in a horizontal plane above the web 46 transversely of the beam. A pair of openings 54 and 56 which extend through the table 52 at its ends receive the cross bars 32 and 34. A third opening 58 internally threaded and parallel to the openings 54 and 56 receives a shaft 60 threaded to register with threads in opening 58. The shaft 60 extends through the vertical flanges 16 and 20 of the side supports 12 and 14 and carries a crank 62 at one end. A collar secured to the flange 16 engages the shaft 60 and prevents it from moving axially relative to the side supports. The crank 62 which is disposed outside of the side support 12 provides ready means for moving the table 52 on the cross bars 32 and 34 between the flanges 48 and 50 of the I-beams.

The reader will note in FIGURE 2 that the cross bar 32 has a scale formed on its upper flattened surface as suggested at 64. An opening 66 formed in the table 62 exposes a portion of the scale which lies within the opening 54. A pointer 68 carried by the table 52 and aligned with its center extends over the opening 66 and with the measure indicates the distance of the center of the table from the inner surface of the flange 48 of the I-beam. The scale 54 normally would be numbered from the flange 48 and thus at any time an operator may determine directly the precise location of the center of the table over the web 46 in relation to the flanges 48 and 50 of the beam.

Much of the structure thus far described is duplicated in vertical planes adjacent the outer surfaces of the flanges 48 and 50. This structure will now be described. Referring first to FIGURE 3, the reader will note that a pair of vertical tubular cross bars 70 and 72 are secured to the horizontal flange 18 of the support 12 by a pair of pins 74 and 76 which extend through spaced apart bosses 78 and 80 and openings formed in the ends of each of the bars. A plate 82 is adjustably carried on the lower ends of the bars 70 and 72 by threaded collars 84 and 86 which register with the threads formed on the bars. Thus, the plate 82 may be raised or lowered on the bars 70 and 72 as desired. A pair of flanged wheels 88 and 90 are supported on the ends of the plate 82 by stub shafts 92 and 94 respectively and are substantially identical to the wheels 24 and 28 carried by the side supports 12 and 14. As is clearly evident in FIGURE 1, the wheels 88 and 90 run along the bottom of the outer surface of the flange 48 and the wheel flanges engage the lower edge of the I-beam flange 48.

A table 98 substantially identical to the table 52 is slidably supported on the cross bars 70 and 72 and is free to move in a vertical plane across the face of the I-beam flange 48. The bar 70 has a measuring scale 100 formed on its outer flattened side visible through an opening 102 formed in the table 98. A pointer 104 formed on the table registers with the scale on the bar 70, and the scale is so arranged as to indicate the distance of the center of the table 98 from the upper edge of the I-beam flange 48. A threaded shaft 106 secured adjacent one end to the horizontal flange 18 of the side support 12 registers with a threaded opening 108 formed in the table 98 and thus, by turning the crank 110 secured to the upper end of the shaft 106, the table 98 may be moved to any position across the outer face of the flange of the beam.

The structure shown in FIGURE 3 and defined in the preceding paragraphs is duplicated on the other side of the beam. In FIGURES 1 and 2 part of this duplicated structure is illustrated. It includes a pair of vertical cross bars 112 (one is shown in FIGURE 1) which carry a plate 114 which in turn supports a pair of flanged wheels 116. These wheels run along the bottom edge of the I-beam flange 50 in the same manner as the wheels 88 and 90 on the other side of the beam. A table 118 is supported on the cross bars 112 and its position is controlled by a threaded shaft 120 which carries a crank 122 at its upper end. A measuring scale is provided on one of the bars 112 which cooperates with a pointer carried by the table 118 to indicate the distance of the center of the table from the upper edge of the flange 50.

It will be noted in FIGURE 1 that each of the tables 52, 98 and 118, respectively, positioned above the web 46 and outside the flanges 48 and 50 carries a post 124. These posts 124 serve as drill supports as suggested in the diagrammatic plan view of FIGURE 6. It will be noted in that figure that each post 124 carries a drill frame or support 126 which includes a pair of arms 128 and 130 having collars 132 and 134 slidable on the post 124. The other ends of the arms 128 and 130 are secured to the body 136 of the drill 138. Thus, the drills 138 are movable on the posts 124 in a direction parallel to the axis of the posts. Fixed to each post 124 intermediate the collars 132 and 134 is a ring 140. These rings 140, unlike the collars 132 and 134 are not free to slide on the posts. Springs 142 surround the posts 124 between the rings 140 and the collars 132 of each drill support and urge the supports away from their supporting table. That is, as viewed in FIGURE 6, the drill 138 supported on the post of table 118 is urged to the left by the spring 142 so that the bit 144 of that drill is positioned away from the outer surface of the I-beam flange 50. In a like manner, the drill supported on the post of table 98 is urged to the right by the spring 142 so that its bit 144 lies away from the outer surface of the I-beam flange 48. By the identical structure, the drill supported on the table 52 is urged upwardly away from the web 46.

Each of the drills is provided with a lever system to enable an operator conveniently to move the drills so that they may perform work upon the beam. These lever systems have been illustrated diagrammatically in FIGURE 6. They include a pair of arms 146 and 148 pivotally joined at their adjacent ends as suggested at 150. The other end of the arm 148 is pivotally secured to the fixed ring 140 while the intermediate portion of the lever arm 146 is connected to the arm 128 of the drill support 126. Thus, by urging the free end of lever arm 146 toward the table which supports the particular drill, the drill plus its support is moved on the post 124 to cause the drill bit to engage either the web or the flanges of the beam to be fabricated. This operation is performed against the bias of the springs 142 and when the levers 146 are released the springs 142 return the drills to their outermost positions.

Figure 6:
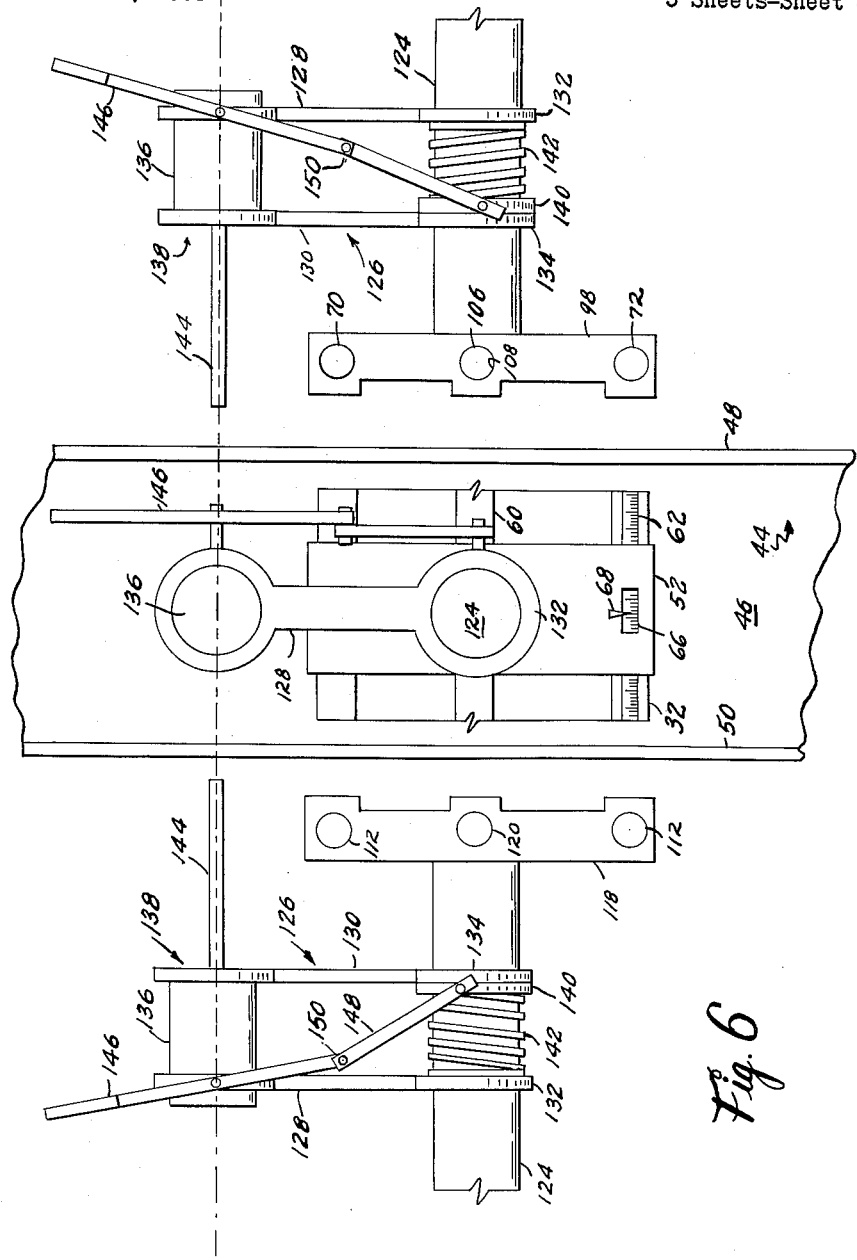
FIGURE 6 is a diagrammatic view of three drills which may be carried by any of the embodiments of my invention, and further illustrating their spacial relationship.

In FIGURE 6 I have illustrated the manner in which the three drills 138 and more particularly their bits 144 are aligned transversely across the beam. The reader will also note in FIGURE 6 that the bits 144 are aligned longitudinally of the beam with the pointers carried by the tables. Thus the pointer 68 secured to the table 52 which lies above the web 46 of the I-beam indicates the distance of the bit 144 from the flange 48 of the beam. The same is true of the other drills and the pointers formed on their respective tables. Therefore, if the fabricating plan calls for a hole to be drilled in the web of the beam three inches inwardly from the flange 48, the operator need only refer to the pointer 68 and the scale 64 to locate the drill supported on the table 52, three inches from that flange. The pointers formed on the tables 98 and 118 in the same manner may locate the drills supported on those tables at any selected distance from the upper edge of the I-beam flanges on their respective sides.

The longitudinal positions of the holes drilled in the web and flanges of the beam are located as follows: A pocket 154 is secured to and spaced from the inner surface of the vertical flange 16 of the side support 12 at its right end, as viewed in FIGURE 3. This pocket is open at the top and is so shaped that it can receive the case of a standard steel measure. The case of the spring loaded wound measure fits within the pocket 144 with the free end of the measure extending out the bottom of the pocket through the slot 156. A roller 158 is supported on the lower ends of a stem 160 whose upper end is secured in a clamp 162 attached to the pocket 154. This roller may be lowered to a position just above the surface of the web 46 of the beam and the adjusting screw 164 which forms part of the clamp 162 allows the operator to compensate for beams of different sizes. The free end of the measure 166 is secured to the end of the beam by a lip or some other conventional means formed at the end of the measure. The tape in use would be connected to the end of the beam from which all longitudinal measurements are made.

On the end of the side support 12 opposite that of the pocket 154 is mounted an indicator 168 which includes a pointer 170. This pointer is longitudinally aligned with the roller 158 and lies immediately above the measure 166. It will be noted that adjusting screws are provided to raise or lower the indicator 168 and to move the pointer 170 longitudinally of the beam in its support. The pointer 170 is adjusted so that it is aligned with the three drill bits transversely of the beam. Thus the pointer 170 indicates on the measure 166 the precise distance of each of the bits from the end of the beam to which the tape measure is secured.

The pocket 154, the tape 166 and the indicator 168 are duplicated on the side support 14 as is evidenced in FIGURE 2. These elements are identified by prime numbers in that figure. Because the longitudinal measuring implements are reversed on the side support 14, it is evident that these parts are used to measure distances from the other end of the beam being fabricated. Furthermore, they will only be used when the drills are reversed on the posts 124 to extend downwardly on the opposite sides of the tables. That is, if the drills are positioned as shown in FIGURE 6, the tape 166' would be used to locate the drill bits from the end of the beam while the tape 166 would be used in combination with the pointer 170 if the drills were reversed.

Having described in detail the structure of the embodiment of my invention shown in FIGURES 1-3, the manner in which it is used will now be described. This embodiment of my invention requires two operators. First, the machine is assembled on one end of the beam to be fabricated and the drills are mounted on their posts to extend toward that end of the beam. Because the cross bars 32 and 34 extend through and beyond the vertical flange of the side support 14, the side supports may be spread to any desired width so that the machine may be used on I-beams of any size. The collars 40 and 42 readily permit the adjustment of the width of the machine. In the same manner, the cross bars 70 and 72 as well as the cross bars 112 are of maximum length and permit the plates 82 and 116 along with the flanged wheels that they carry to be lowered to any distance so as to engage the bottom edges of the flanges of the beam.

After the machine is assembled on the beam, the end of the measure 166 is connected to that end of the beam and the pointer 170 is aligned with the bits of the drills. The machine is then ready for operation. If the layout calls for a hole in the web 46, twelve inches from the end of the beam, the machine is rolled on the beam until the pointer 170 indicates that the drills are that distance from the end of the beam. Next, the drill supported on the table must be located the required distance from the flanges of the beam. The scale 64 on the cross bar 32 in cooperation with the pointer 68 enables the operator to locate the transverse measurement and place the drill in the precise position. Thereafter, the operator need only actuate the free end of the lever 146 to lower the drill to the web and form the hole.

Precisely the same operations are followed in drilling holes in the flanges. The pointer 170 locates the drills adjacent each flange at any desired distance from the end of the beam. The scales formed on the cross bars 70 and 112 enable the operator to locate the drills any desired distance from the top edges of the flanges. The reader will recall that cranks 62, 110 and 122 are provided to move the tables transversely across the web and flanges.

To prevent the cross bars 70 and 72 adjacent the flange 48 and the cross bars 112 adjacent the flange 50 from bowing outwardly in reaction to the forces applied when the drills are used to form holes, it may be desirable to use some form of clamping device, such as a vise clamp, to prevent the wheels 88 and 90 and the wheels 116 from moving away from the bottom of flanges 48 and 50. Any form of clamp which engages the plate 82 and the lower end of the flange 48 could be used for this purpose. Similar clamps of course would be used to engage the plate 114 and the lower portion of the flange 50 of the beam. These clamps would be used only when the machines have been located precisely in the position desired from the reference end of the beam and would be loosened or removed when the machine is moved along the beam.

While the machine described is most efficiently operated by two men, one stationed on each side of the beam, the embodiment of my invention shown in FIGURES 4 and 5 may be operated by one man stationed on the right side as viewed in FIGURE 4. This embodiment includes every element of the embodiment shown in FIGURES 1-3, but includes additional means for controlling the three tables from the side of the machine and for determining the location of the table on the other side of the beam when stationed on the right side. In the plan view of the second embodiment shown in FIGURE 4, the reader will note that a third crank 200 is shown on the right side of the machine in addition to the cranks 62 and 110. While the cranks 62 and 110 control the positions of the tables 52 and 98, the crank 200 may be used alternately with the crank 122 to control the position of the table 118 on the left side of the machine shown in the left side view of FIGURE 5. This is accomplished by a helical gear 202 which is carried on the left end of the shaft 204 operated by the crank 200. The gear 202 registers with a helical gear 206 formed at the upper end of the shaft 120 which directly actuates the table 118. Thus, as is clearly evidenced in FIGURE 5, either the crank 122 or the helical gear 202 may be used to rotate the shaft 120 to move the table 118 upwardly and downwardly on the bars 112. Thus, it is seen that an operator positioned on the right side of the machine as viewed in FIGURE 4, can operate and control the position of all of the tables which support drills.

In FIGURE 5 it will be noted that a rule 208 is secured to the table 118 and extends upwardly above the height of the side support 14. Extending upwardly from the top of the vertical flange 20 of the side supports 14 is a post 210 which bears a pointer 212. The pointer 212 extends from the post 210 to the rule and is disposed in front of the rule when the machine is viewed from its right side. The scale of the rule 208 is marked on the inner surface of the rule so that it too may be viewed from the right side of the machine. The scale is arranged so that when the center of the table 118 is at the same elevation as the edge of the flange 50 of the I-beam fabricated, the pointer is adjacent the reference or zero position of the scale. As the table 118 is lowered on the cross bars 112 by either the crank 200 or the crank 122, the rule 208 moves with the table 118 and the pointer indicates how far down the table has been moved on its supporting base. To lend rigidity to the ruler, that is, to prevent it from flexing, it may extend from the table 118 through a slot 214 formed in the horizontal flange of the side supports 14. In this manner, the rule remains in a vertical position to render an accurate measurement of the position of the table 118 and more particularly the position of the drill bit carried by that table.

Having described in detail two embodiments of my invention and further described in the manner in which they operate, the considerable advantages of my machine will now be fully appreciated. Either embodiment of my invention is capable of performing complete fabrication of I-beams and totally eliminates handling of the beam. The fabrication may be performed at any location, even at the building site. The machine may be employed to work on beams of all sizes, and it may readily be transferred from one beam to another by the lifting lugs 220 which are secured to the vertical flanges of the side supports 12 and 14. Obviously the cost of the machine disclosed herein is but a minute fraction of the cost of the equipment now used in beam fabrication. Moreover, while it is economically unfeasible to set up a spacing table for the fabrication of one or a small number of beams, there is no economic prohibition against the use of my machine for the fabrication of a limited number of beams. It should also be appreciated that although the foregoing description is presented in terms of beam fabrication, my spacing drill may be used for the fabrication of plates or other structural members.

Those skilled in the art will appreciate that numerous modifications may be made of the illustrated embodiments without departing from the spirit of my invention. For example, although I have suggested that the scales on the cross bars may be arranged to measure from one side of the web and flanges, it is clear that they could be arranged to measure the locations of the drills from the center of the web and flanges. Therefore, I do not intend to limit the scope of my invention to the specifically described embodiment but rather the breadth of my invention should be determined by the appended claims and their equivalents.

What I claim as new and desire to secure by Letters Patent of the United States is:

1. A drill assembly comprising a frame, means secured to the frame supporting it for movement on stock to be worked upon by the drill assembly, a horizontal table forming part of the frame, means supporting the table for movement in a horizontal plane between the sides of the frame, a drill supported vertically on the table with its bit directed downwardly toward the frame, a second table forming part of the frame and disposed in a vertical plane on one side of the frame, means supporting said second table for movement in its vertical plane between the top and bottom of the frame on that side of the frame, a third table forming part of the frame and disposed in a vertical plane on the other side of the frame, means supporting said third table for movement in its vertical plane between the bottom and the top of the frame on said other side of the frame, drills supported horizontally on each of the vertical tables and directed inwardly toward the frame, means forming part of the frame and engaging the tables for maintaining the bits of each of the three drills in a common plane transversely of the frame, measures secured to the frame and disposed adjacent the planes in which the tables move for indicating the position of each of the movable tables with respect to the frame, and an additional measure disposable on the stock to be worked and along the path of movement of the frame for indicating the distance of the common plane of the bits from a reference position on the stock.

2. A drill assembly as defined in claim 1 further characterized by shafts secured to the frame and engaging each of the tables for moving the tables in their respective planes when the shafts are rotated, and means connected to each of the shafts and operable all from one side of the frame for rotating the shafts.

3. In combination with an I-beam to be fabricated and oriented with its web in a substantially horizontal plane, a spacing drill comprising a frame, a plurality of flanged wheels secured to the frame and engaging the edges of the flanges of the beam, said wheels supporting the frame for longitudinal movement over the web of the beam, a plurality of drills and bits supported on the frame with one drill and bit disposed vertically and facing the web of the beam and other drills and bits disposed horizontally and facing the flanges of the beam, means interconnecting the drills and the frame and maintaining the bits of the drills in a common plane transverse to the beam, a measure secured to one end of the beam and extending longitudinally of the beam along the path travelled by the frame, and a pointer secured to the frame and disposed in the plane of the bits and adjacent the measure, said pointer co-operating with the measure for indicating the distance of each bit from said end of the beam.

4. The combination as defined in claim 3 further characterized by means movably supporting said one drill and bit on the frame for transverse movement across the web while maintaining said bit in the common plane, additional means movably supporting the other drills and bits on the frame for transverse movement across the flanges of the beam while maintaining said bits in the common plane, and measuring means secured to the frame and extending transversely across the web and flanges for indicating the transverse positions of the bits over the web and flanges of the beam.

5. In combination with an I-beam to be fabricated and oriented with its web in a substantially horizontal plane, an assembly for supporting tools to perform work upon the flanges and web of the beam comprising a frame, a plurality of flanged wheels secured to the frame and rollable on the edges of the flanges of the beam enabling the frame to move longitudinally over the web of the beam, a horizontal table forming part of the frame, means supporting the table for movement transversely across the web in the plane of the table, a second table disposed in a vertical plane and forming part of the frame, means supporting said second table for movement transversely across one of the flanges of the beam in the plane of the second table, a third table disposed in a vertical plane and forming part of the frame, means supporting said third table for movement transversely of the other flange of the beam in the plane of the third table, supports secured to each of the tables for supporting tools to perform work on the web and flanges of the beam and oriented to carry the tools in a common plane transverse to the beam, a measure secured to one end of the beam and extending longitudinally of the beam, a pointer secured to the frame and co-operating with the measure for indicating the position of each tool relative to said end of the beam, and additional measures secured to the frame for indicating the transverse position of each of the supports with respect to the web and flanges of the beam.

6. A drill assembly for fabricating I-beams and similar stock comprising a frame, means secured to the frame for supporting the frame for movement along a straight path parallel to a predetermined axis about which the stock to be fabricated is adapted to be oriented, three drills mounted on the frame and disposed in a common plane perpendicular to the axis, means supporting each drill on the frame for transverse movement in the common plane, and means including measures secured to the frame for indicating the distance of the drills from reference points in the plane and the distance of the plane from a preselected reference point on the axis.

7. A drill assembly comprising a frame, roller means secured to the frame for supporting the frame for movement along a path parallel to a predetermined axis about which work to be fabricated by the assembly is symmetrically oriented, two mutually perpendicular drills mounted on the frame and having bits disposed in a common plane perpendicular to the axis, and measuring means carried by the frame and extending along the path for indicating the distance of the common plane of the bits from a predetermined reference point on the axis.

8. A tool carrying assembly comprising a frame, roller means secured to the frame for supporting the frame for movement along a path parallel to a predetermined axis along which work to be fabricated is oriented, two mutually perpendicular tool supports mounted on the frame in a common plane perpendicular to the axis, and measuring means carried by the frame and extending along the path for indicating the distance of the common plane from a predetermined reference point on the axis.

References Cited in the file of this patent

UNITED STATES PATENTS

| 1,247,341 | Skinner | Nov. 20, 1917 |
| 1,256,073 | Stevenson | Feb. 12, 1918 |
| 2,623,419 | Wales | Dec. 30, 1952 |
| 2,748,627 | Goldschmidt | June 5, 1956 |
| 2,871,730 | Gremp | Feb. 3, 1959 |

FOREIGN PATENTS

| 365,234 | Great Britain | Jan. 21, 1932 |